Oct. 15, 1968   R. L. THOMPSON   3,405,808
PROTECTIVE HAT RACK
Filed Jan. 7, 1966
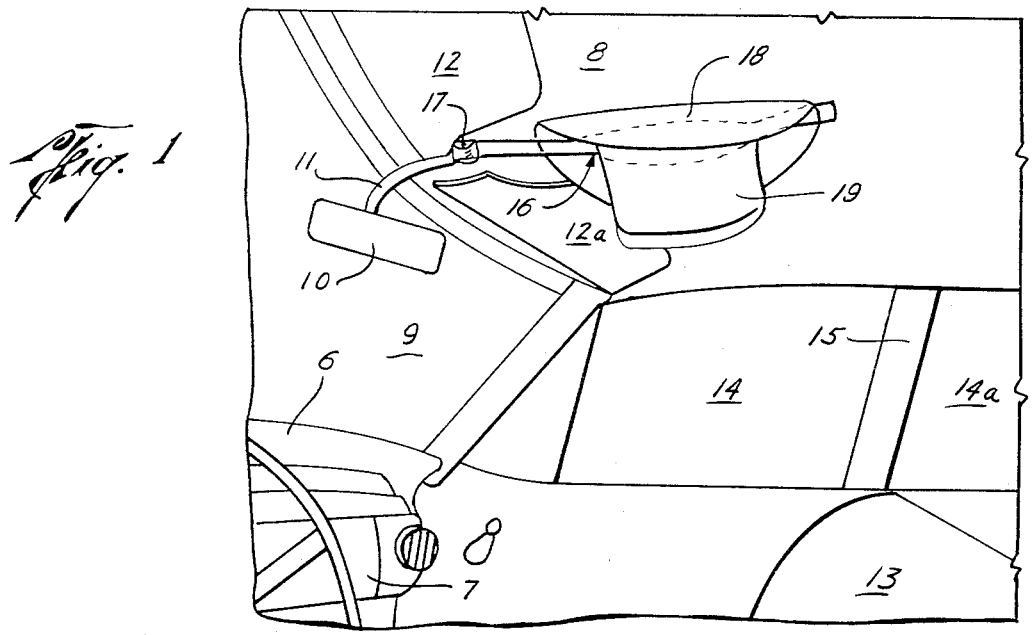
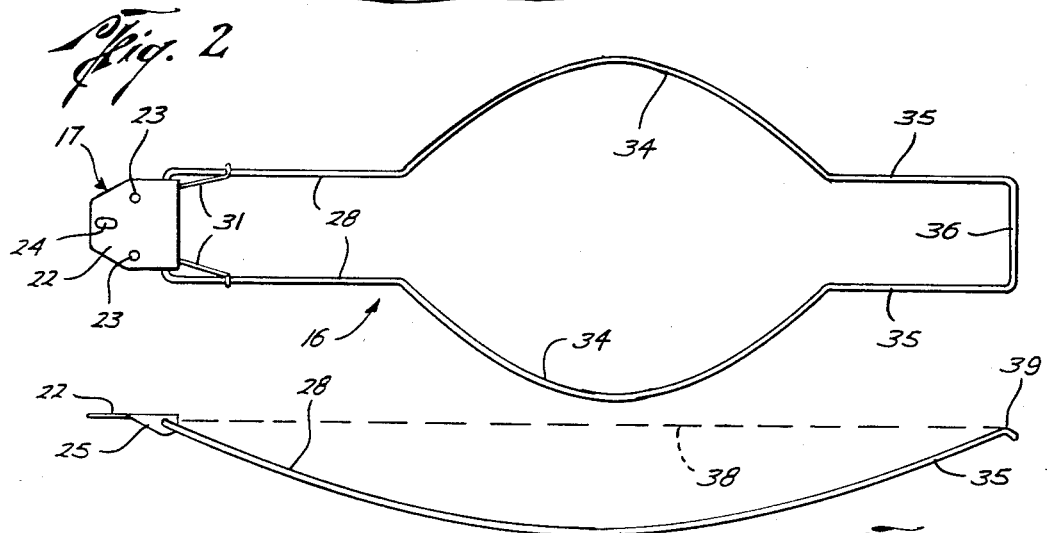
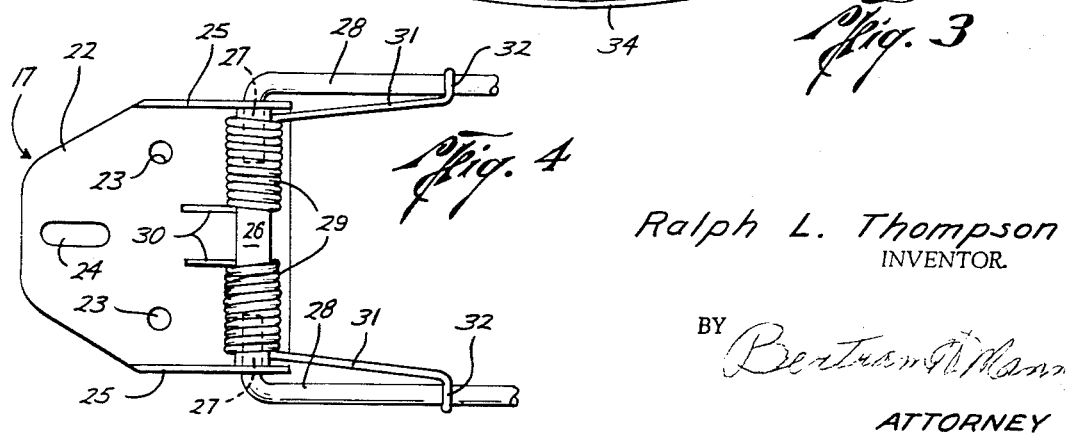
Ralph L. Thompson
INVENTOR.
BY Bertram R. Mann
ATTORNEY

3,405,808
PROTECTIVE HAT RACK
Ralph L. Thompson, 1047 Sally Anne Drive,
Rosenberg, Tex. 77471
Filed Jan. 7, 1966, Ser. No. 519,392
2 Claims. (Cl. 211—31)

ABSTRACT OF THE DISCLOSURE

A hat rack for carrying a hat, particularly a western style hat, against the ceiling of an automobile. The rack is formed of a pair of generally parallel wires forming an intermediate loop in which the hat crown is received, one end of both wires being pivotally secured to a bracket attached to the ceiling while the other end is upturned providing protective clearance between the loop and the roof ceiling.

---

This invention relates to hat racks and consists particularly in a novel rack for supporting a western type or other hat in a convenient yet non-crushing position in an automobile.

Drivers and passengers in automobiles frequently find that they must remove their hats. However, place for storage of such hats may be difficult to find, particularly where several passengers are being transported. Even though such storage space may be available, it is not conveniently reached. While there have been suggestions of the provision of hat racks secured to the roof of the car, such racks generally have been of the type which firmly presses and distorts the hat brim against the roof in a damaging manner.

Accordingly, an object of the present invention is to provide a novel hat rack for automobiles.

Another object is to provide a hat rack which will store a hat, particularly a man's hat, in a convenient position.

Still another object is to provide a hat rack for supporting a hat, particularly of a western or rolled brim type, upon a wall or roof, as of an automobile, but without mashing the hat brim against the wall.

Still another object is to provide a rat rack which will securely support the hat in an out-of-the-way yet conveniently-reached position and in which the hat can be readily inserted.

These objects and others hereafter appearing are attained by the hat rack device illustrated in the accompanying drawings in which:

FIG. 1 is a perspective view showing a portion of the interior of an automobile with the novel hat rack in hat-supporting position therein;

FIG. 2 is an enlarged plan view of the rack detached;

FIG. 3 is a side view of the rack; and

FIG. 4 is a view of the mounting hinge.

FIG. 1 illustrates the interior forward portion of a conventional passenger automobile including a cowl portion 6, dashboard 7, steering wheel (not designated), windshield 9, and rear view mirrow 10 having a curved support arm 11 secured at its end to the roof structure 8 between pivoting sun visors 12 and 12a. The back of the front seat is shown at 13 and side windows at 14 and 14a with a door post 15 therebetween. The hat rack frame, generally designated 16, has a mounting bracket generally designated 17 at its left end, in this instance secured to or against the mounting bracket (not shown) at the end of mirror arm 11. A western-style hat having a large rolled brim 18 and a crown 19 is supported in the bracket.

The rack mounting bracket 17 includes a plate 22 having screw holes 23 and slot 24 and apertured lugs 25 in which is seated a tube 26. The in-turned ends 27 of left-hand end members 28 of bracket framing 16 are rotatably received in the ends of tube 26 and held therein by the resilience of the framing. Coiled about the tube are spring wires 29 each with one end 30 lodged against the face of bracket plate 22 and its other, longer end 31 having a hook 32 lodged about one of the framing arms 28. The spring wires are stressed torsionally so as to normally urge bracket framing 16 toward the automobile roof 8.

Framing 16, conveniently, is formed of a continuous, fairly stiff wire including previously-mentioned parallel arms 28 terminating in in-turned, pivoting fingers 27, intermediate, oppositely-bowed portions 34 forming a loop, and rightwardly-projecting arm elements 35 terminating in a connecting crossbar 36. Loop-forming portions 34 are shaped to loosely receive the crown of a hat while the brim projects laterally therebeyond and along outward diametral arms 28 and 35.

In order to avoid pressing the hat brim against the roof and, thereby, to protect the brim in the flush position of the rack, the framing parts 28, 34, and 35 are bowed in the direction transversely of the general plane thereof, as best indicated, somewhat exaggerated, in FIG. 3 in which the dotted line 38 represents the roof line. Thus, the rack is in engagement with the roof only at its extremities—that is, at and adjacent bracket 17 and at or near end bar 36. The right-hand ends of arms 35, preferably, are curved downwardly as at 39 so that bar 36 will clear the roof sufficiently to be grasped by the operator.

In operation, the rack, normally, will be maintained by torsion springs 29 in its out-of-the-way position, with its ends bearing against the mounting roof or other wall. In order to place a hat in the rack, the operator grasps the end bar 36 and swings the rack frame clockwise with respect to the position illustrated in FIG. 1. Thereupon, the crown portion of the hat is dropped between loops 34 and the frame then allowed to swing upwardly with the hat to the supporting position shown in FIG. 1. Due to the downward bowing of the rack frame, a shaped brim, as in a western or Homburg type hat, will rest freely and without pressure but securely in the space between the frame and roof line so that the hat brim will not be distorted or soiled and, likewise, avoiding pressure against the vehicle roofing, usually cloth. This is particularly important in the case of a western style ("ten-gallon") hat, the large brim of which may be distinctively curved or dished downwardly or upwardly from front to back and curved outwardly and upwardly at the sides. The oppositely-projecting arms 28 and 35 as well as the bowing of the frame contribute to this protective action with respect to the hat brim. In the supported position, of course, the hat is clear of the operator and passengers, yet the rack may be easily reached for insertion and removal of the hat.

The holder is particularly adapted for hats having large, soft brims which may be adversely affected by being pressed against a ceiling or other background board.

Various other features of the invention may be modified as will occur to those skilled in the art, and the exclusive use of all modifications as come within the scope of the appended claims is contemplated.

I claim:

1. A protective holder for securing adjacent a ceiling a western style or other hat having a large brim of predetermined expanse dished from front to back and curved outwardly and upwardly at the sides comprising a pair of side members with generally parallel end portions and oppositely bowed intermediate portions forming a loop for loosely receiving the inverted crown of the hat, a mounting bracket at one end of said frames for attachment to the ceiling, resilient pivotal attachment means between said frames and said bracket, and a connecting bar between the opposite end portions of said frames, said bracket and said end portions being spaced beyond said bowed intermediate portions of said frames a distance greater than the predetermined expanse of the hat brim from front to back and said frames being downwardly bowed between said bracket and said opposite end portions for supporting the hat brim with said opposite end portions bearing against the ceiling, without pressing the brim against the ceiling.

2. A holder as described in claim 9 in which said bar is at least in part spaced from the ceiling in the hat supporting position of the holder to form a manipulating handle portion.

References Cited

UNITED STATES PATENTS

| | | | |
|---|---|---|---|
| 348,983 | 9/1886 | Mack | 211—32 |
| 1,473,338 | 11/1923 | Crose | 211—31 |
| 1,566,920 | 12/1925 | Pie | 211—31 |
| 1,591,587 | 7/1926 | Walk | 211—31 |
| 1,700,823 | 2/1929 | Dellinger | 211—32 |
| 2,574,557 | 11/1951 | Goodhand | 211—30 |

FOREIGN PATENTS

| | | |
|---|---|---|
| 139,343 | 3/1920 | Great Britain. |
| 331,500 | 11/1935 | Italy. |

ROY D. FRAZIER, *Primary Examiner.*

A. FRANKEL, *Assistant Examiner.*